(12) United States Patent
Shimomura et al.

(10) Patent No.: US 7,866,442 B2
(45) Date of Patent: Jan. 11, 2011

(54) MUFFLER AND VEHICLE EQUIPPED WITH MUFFLER

(75) Inventors: Kazuhiko Shimomura, Shizuoka (JP); Hironobu Suzuki, Shizuoka (JP)

(73) Assignee: Yamaha Hatsudoki Kabushiki Kaisha, Iwata-Shi (JP)

( * ) Notice: Subject to any disclaimer, the term of this patent is extended or adjusted under 35 U.S.C. 154(b) by 174 days.

(21) Appl. No.: 11/617,565

(22) Filed: Dec. 28, 2006

(65) Prior Publication Data

US 2007/0158136 A1 Jul. 12, 2007

(30) Foreign Application Priority Data

Jan. 6, 2006 (JP) .............................. 2006-001894
Jun. 23, 2006 (JP) .............................. 2006-174462

(51) Int. Cl.
F01N 1/02 (2006.01)
F01N 1/00 (2006.01)
F01N 1/06 (2006.01)

(52) U.S. Cl. ........................ 181/249; 181/255; 181/269; 181/272

(58) Field of Classification Search ................ 181/249, 181/248, 247, 251, 255, 256, 252, 257, 227, 181/228, 269, 272, 267, 266, 273, 276
See application file for complete search history.

(56) References Cited

U.S. PATENT DOCUMENTS

| | | | | |
|---|---|---|---|---|
| 2,047,443 A | * | 7/1936 | Starkweather et al. | 181/249 |
| 2,189,424 A | * | 2/1940 | Leadbetter | 181/256 |
| 2,675,088 A | * | 4/1954 | McLeod | 181/265 |
| 3,209,861 A | * | 10/1965 | Whitney | 181/252 |
| 3,545,565 A | * | 12/1970 | McCaffrey, Jr. | 181/256 |
| 3,710,891 A | * | 1/1973 | Flugger | 181/256 |
| 3,858,678 A | * | 1/1975 | Haren | 181/227 |
| 3,887,032 A | * | 6/1975 | Harris | 181/273 |
| 4,116,303 A | * | 9/1978 | Trudell | 181/252 |
| 4,361,206 A | | 11/1982 | Tsai | |
| 4,367,808 A | * | 1/1983 | Oberg | 181/272 |

(Continued)

FOREIGN PATENT DOCUMENTS

DE    2527496 A1    12/1976

(Continued)

OTHER PUBLICATIONS

European search report for corresponding European application No. 06256611 lists the references and provides relevancy statements for any non-English language references.

*Primary Examiner*—Edgardo San Martin
(74) *Attorney, Agent, or Firm*—Rabin & Berdo, PC (57) ABSTRACT

A muffler that inhibits reduction in engine performance and reduces exhaust noise volume includes a front chamber and an expansion chamber with a partition therebetween. A conduit passes through the expansion chamber. An upstream end of the conduit passes through the partition and opens in the front chamber. A partition wall is provided in a central section of the conduit. An outflow section upstream from the partition wall has a side surface in which outflow holes are formed that allow exhaust gas to flow out to the expansion chamber. An inflow section downstream from the partition wall has a side surface formed with inflow holes that allow exhaust gas to flow in from the expansion chamber.

24 Claims, 6 Drawing Sheets

U.S. PATENT DOCUMENTS

| | | | |
|---|---|---|---|
| 4,487,289 A * | 12/1984 | Kicinski et al. | 181/252 |
| 4,595,073 A * | 6/1986 | Thawani | 181/265 |
| 5,016,438 A | 5/1991 | Harris | |
| 5,321,215 A * | 6/1994 | Kicinski | 181/211 |
| 5,355,973 A * | 10/1994 | Wagner et al. | 181/258 |
| 5,608,194 A | 3/1997 | Okazaki et al. | |
| 5,663,537 A * | 9/1997 | Ko et al. | 181/228 |
| 5,892,186 A * | 4/1999 | Flugger | 181/252 |
| 5,902,970 A * | 5/1999 | Ferri | 181/249 |
| 5,921,079 A | 7/1999 | Harris | |
| 6,082,487 A * | 7/2000 | Angelo et al. | 181/256 |
| 6,116,376 A * | 9/2000 | Chu | 181/256 |
| 6,241,044 B1 * | 6/2001 | Nishiyama et al. | 181/272 |
| 6,334,506 B1 * | 1/2002 | Hamrin et al. | 181/249 |
| 6,571,910 B2 * | 6/2003 | Storm | 181/264 |
| 6,640,927 B1 * | 11/2003 | Turner | 181/252 |
| 6,880,670 B2 * | 4/2005 | Dondi | 181/269 |
| 2004/0069562 A1 * | 4/2004 | Kondo et al. | 181/227 |
| 2007/0151798 A1 * | 7/2007 | Smith | 181/256 |
| 2007/0158135 A1 * | 7/2007 | Shimomura | 181/251 |

FOREIGN PATENT DOCUMENTS

| | | |
|---|---|---|
| EP | 0879937 A1 | 11/1998 |
| JP | 2005-090237 | 4/2005 |

* cited by examiner

MUFFLER AND VEHICLE EQUIPPED WITH MUFFLER

RELATED APPLICATIONS

This application claims the benefit of priority under 35 USC 119 of Japanese patent application no. 2006-001894, filed on Jan. 6, 2006, and Japanese patent application no. 2006-174462, filed on Jun. 23, 2006, which applications are hereby incorporated by reference in their entireties.

BACKGROUND OF THE INVENTION

1. Field of the Invention

The present invention relates to a muffler that inhibits reduction in engine performance and reduces exhaust noise volume.

2. Description of Related Art

A conventional muffler has a front chamber in which a catalyst is provided, an expansion chamber, and a conduit that passes through the expansion chamber. Holes are formed in a side surface of an upstream end portion of the conduit that protrudes in to the front chamber. Exhaust gas from an engine flows into the conduit from the holes of the protruding section, and then flows out to the expansion chamber from the conduit at the downstream side thereof. Then, the exhaust gas flows into the conduit again at the downstream side and is exhausted to the open air from a downstream end of the conduit (see, for example, JP-A-2005-90237 (FIG. 3)).

A motorcycle equipped with such a muffler can reduce unpleasant noise and generate a pleasant exhaust sound. Thus, a rider of the motorcycle can enjoy the exhaust sound generated by the muffler in addition to the engine noise.

However, because attention has been focused on achieving a pleasant exhaust sound, not enough consideration has been given to reducing exhaust noise volume.

SUMMARY OF THE INVENTION

The invention addresses these problems and provides a muffler that inhibits reduction in engine performance and at the same time reduces exhaust noise volume.

A muffler according to a first aspect of the invention includes a front chamber and an expansion chamber with a partition therebetween. A conduit passes through the expansion chamber. An upstream end of the conduit passes through the partition and opens in the front chamber. A partition wall is provided at a central section of the conduit. An outflow section upstream from the partition wall and has a side surface in which outflow holes are formed that allow exhaust gas to flow out to the expansion chamber. An inflow section downstream from the partition wall has a side surface formed with inflow holes that allow exhaust gas to flow in from the expansion chamber.

The muffler according to the invention inhibits reduction in engine performance and reduces exhaust noise volume. Because exhaust gas flows into the opening formed in the upstream end of the conduit, there is no need to extend the conduit a long way into the front chamber. Thus, the front chamber is effectively used to expand exhaust gas. Accordingly, generation of unpleasant noise is inhibited while a pleasant exhaust sound with a reduced volume is generated.

In one embodiment, a catalyst device for reforming exhaust gas is provided in the front chamber to efficiently reform exhaust gas. Since there is no need to extend the conduit a long way into the front chamber, an adequate distance between the upstream end of the conduit and the downstream end of the catalyst device is ensured. Thus, there is no uneven flow of exhaust gas through the catalyst device, thereby allowing the catalyst inside the catalyst device to effectively reform the exhaust gas.

In one embodiment, the length of an upstream side section of the conduit upstream from the outflow section is equal to or more than 1.5 times the inner diameter of the upstream side section, thereby reducing exhaust noise volume more effectively.

In one embodiment, the opening surface area of the inflow holes is smaller than the pipe inner cross sectional area of a downstream side section of the conduit that is downstream from the inflow section. In this case, the opening surface area of the inflow holes is equal to or less than 0.6 times the pipe inner cross sectional area of the downstream side section of the conduit downstream from the inflow section. This structure effectively reduces the high frequency region in the exhaust noise, thereby reducing noise volume and generating an appealing exhaust sound with an accentuated low sound.

In one embodiment, the opening surface area of the outflow holes is larger than the pipe inner cross sectional area of an upstream side section of the conduit that is upstream from the outflow section. In this case, the opening surface area of the outflow holes is larger than the pipe inner cross sectional area of the upstream side section of the conduit upstream from the outflow section, with the opening surface area being equal to or less than 1.5 times larger than the pipe inner cross sectional area. In this structure the flow of exhaust gas to the expansion chamber from the conduit is made smoother.

A vehicle equipped with a muffler according to the invention inhibits reduction in engine performance and reduces exhaust noise volume. Generation of unpleasant noise is inhibited while a pleasant exhaust sound with a reduced volume is generated. As a result, the rider can enjoy the exhaust sound in addition to the engine sound. The invention is not limited to a particular vehicle and may be a motorcycle (including mopeds (scooters)), a four wheel buggy (all-terrain vehicle), a snowmobile, or the like.

Other features and advantages of the invention will be apparent from the following detailed description, taken in conjunction with the accompanying drawings which illustrate, by way of example, various features of embodiments of the invention.

DETAILED DESCRIPTION OF THE INVENTION

Embodiments of the invention are now described with reference to the drawings. Each embodiment is described in the context of a motorcycle as an exemplary vehicle according to the invention.

First Embodiment

Figure 1:
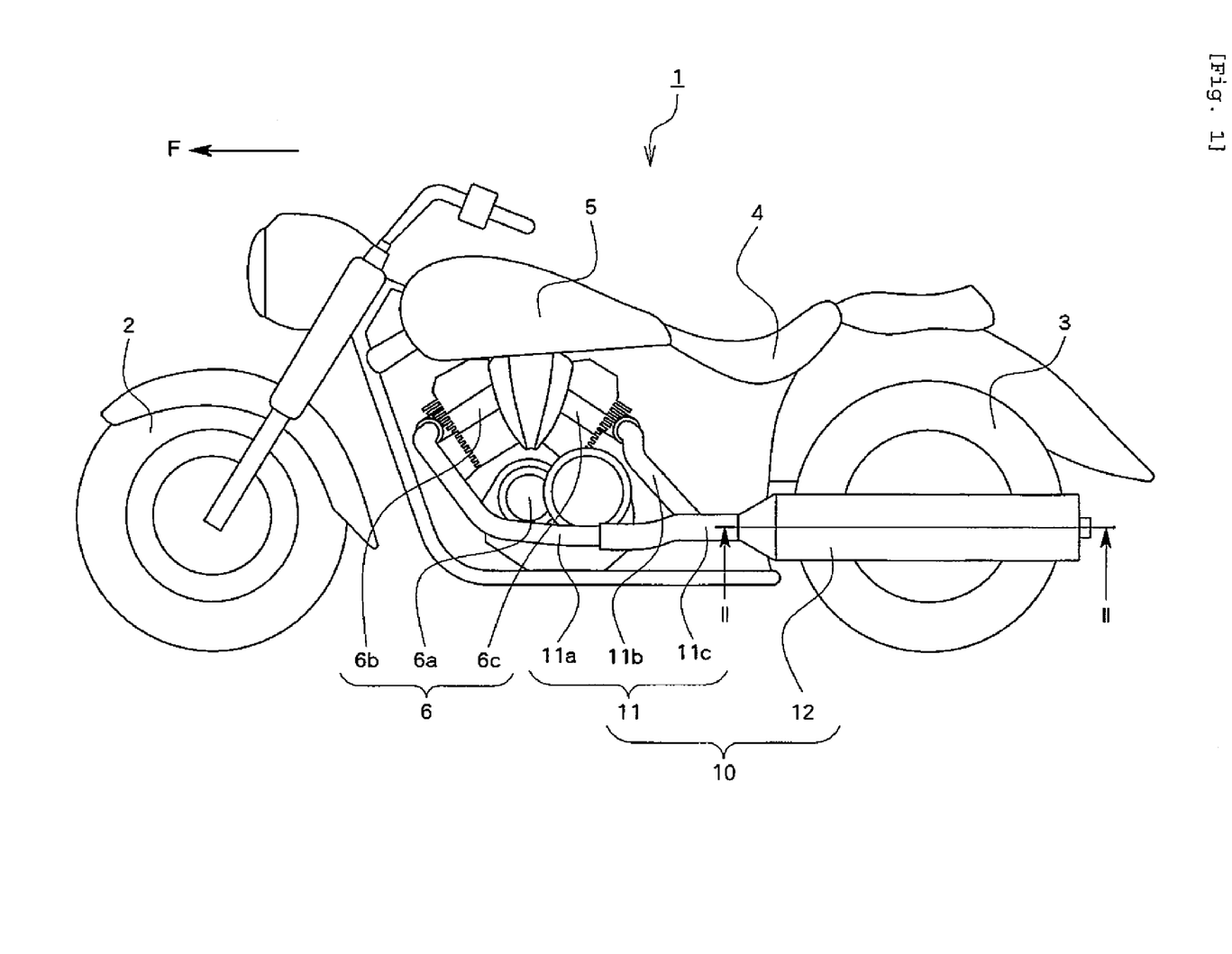
FIG. 1 is a side view of a motorcycle according to the present invention.

FIG. 1 is a side view of a motorcycle 1 according to a first embodiment of the invention. Motorcycle 1 includes a front wheel 2 and a rear wheel 3 that are rotatably supported by a vehicle body; a seat 4; a fuel tank 5; and an engine 6 that drives rear wheel 3. Engine 6 is a 4-stroke, V-type, 2 cylinder engine that has a crank case 6a, and a front cylinder head section 6b and a rear cylinder head section 6c that incline, respectively, upward and forward (the direction indicated by arrow F in FIG. 1) and upward and rearward from crank case 6a. Injectors (not shown) and throttle valves (not shown) that supply, respectively, fuel to engine 6 and air that mixes with the fuel are connected to intake ports (not shown) of front and rear cylinder head sections 6b and 6c. Engine 6 generates driving force by combusting the fuel.

A muffler 10 exhausts exhaust gas from engine 6 and muffles exhaust noise. An upstream end of muffler 10 is connected to exhaust ports (not shown) of front and rear cylinder head sections 6b and 6c. Muffler 10 has an exhaust pipe 11 and a muffler body 12. Exhaust pipe 11 includes a front exhaust pipe 11a and a rear exhaust pipe 11b that extend rearward from the connecting section with the exhaust ports; and an exhaust pipe downstream end section 11c where a downstream section of front exhaust pipe 11a and a downstream section of rear exhaust pipe 11b merge. Muffler body 12 is connected to and extends rearward from the downstream end of exhaust pipe downstream end section 11c.

Exhaust gas from engine 6 flows from combustion chambers of front and rear cylinder head sections 6b and 6c, along front and rear exhaust pipes 11a and 11b and into exhaust pipe downstream end section 11c. Then, the exhaust gas is introduced to muffler body 12 and exhausted into the open air from a downstream end of muffler body 12.

Figure 2:
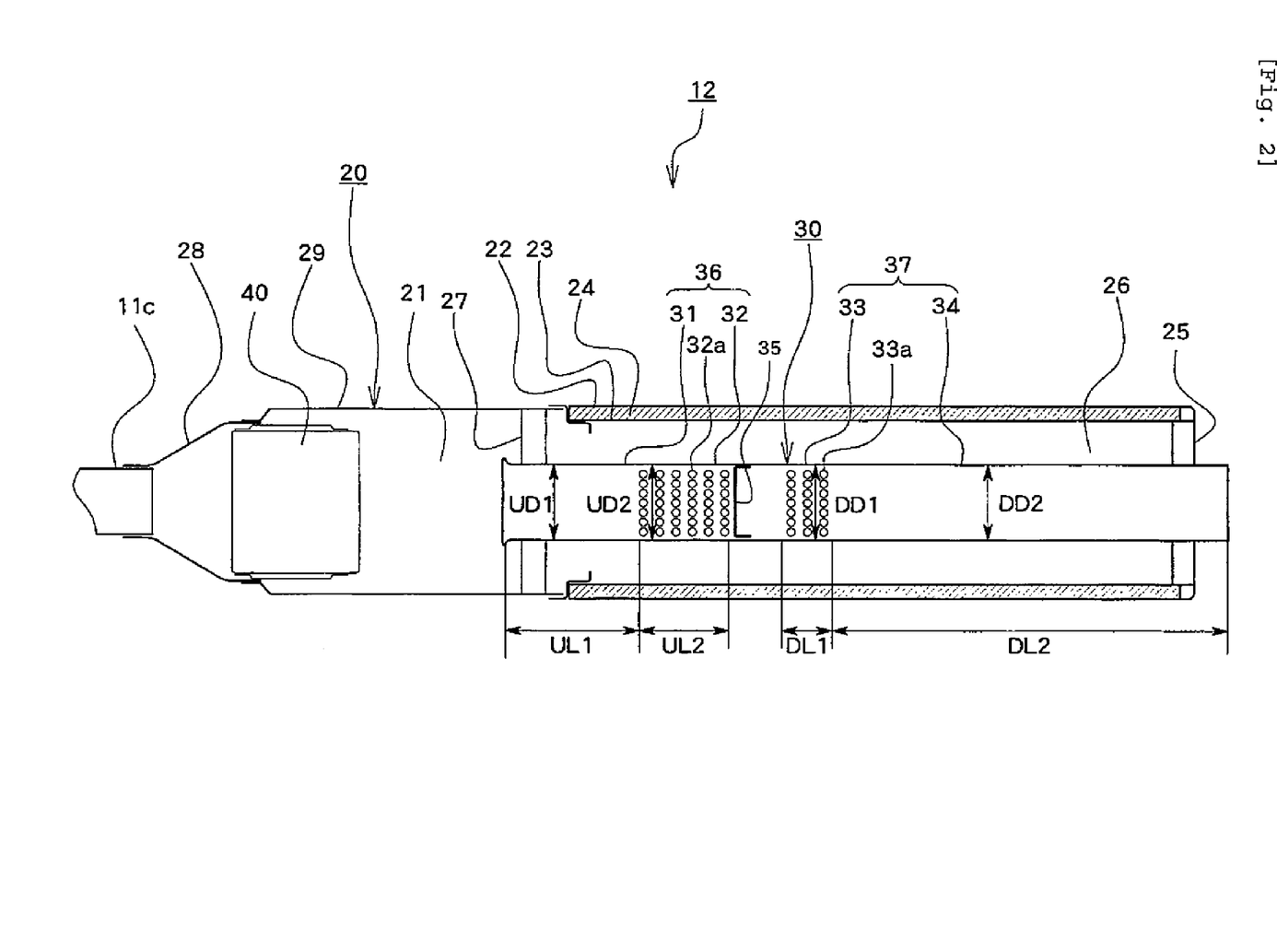
FIG. 2 is a cross sectional view of a muffler according to a first embodiment of the present invention.

FIG. 2 is a cross sectional view of muffler body 12 taken through line II-II of FIG. 1. Muffler body 12 has a body section 20 and a single conduit 30. A single front chamber 21 and a single expansion chamber 26 are provided inside body section 20, and conduit 30 passes through expansion chamber 26 of body section 20 in the longitudinal direction.

An upstream end section of body section 20 is connected to exhaust pipe downstream end section 11c, and has a taper section 28 that has an inner diameter that increases downstream from its connection to exhaust pipe section 11c; and an extending section 29 that has a round tubular shape and that is connected to the downstream side of taper section 28. A round outer tubular section 22 extends from the downstream side of extending section 29. In addition, an inner tubular section 23 with an outer diameter smaller than the inner diameter of outer tubular section 22 is provided inside outer tubular section 22. Thus, a double pipe comprised of outer tubular section 22 and inner tubular section 23 is connected to the downstream side of extending section 29. A sound insulating material layer 24 is provided between outer tubular section 22 and inner tubular section 23. Sound insulating material layer 24 comprises a sound insulating material like glass wool. In other words, the outside diameter of expansion chamber 26 is surrounded by sound insulating material layer 24. A plurality of holes (not shown) are formed in a side surface of inner tubular section 23, and sound insulating material layer 24 is exposed to the inside of expansion chamber 26 via the holes. A round tubular cover section 25 is attached by welding to the downstream end of body section 20, namely, the downstream ends of outer and inner tubular sections 22 and 23, to seal the downstream end of expansion chamber 26.

A partition 27 that has a round tubular shape and that blocks flow of exhaust gas in the longitudinal direction inside body section 20 is provided at a central section of body section 20. Expansion chamber 26 is provided downstream from partition 27, and has its upstream and downstream ends respectively blocked by partition 27 and cover section 25. A front chamber 21 upstream from partition 27 has its upstream and downstream ends blocked respectively by taper section 28 and partition 27. Thus, front chamber 21 and expansion chamber 26 are provided, respectively, at the upstream and downstream sides of partition 27.

A catalyst device 40 for reforming (purifying) exhaust gas straddles taper section 28 and extending section 29 in front chamber 21. Exhaust gas passes from the upstream to the downstream side of catalyst device 40 while being subjected to the reaction of a catalyst in catalyst device 40.

Accordingly, exhaust gas flows first from exhaust pipe downstream end section 11c to the section of front chamber 21 upstream from catalyst device 40. The exhaust gas then passes to the downstream side of catalyst device 40, and having been reformed by the reaction of the catalyst in catalyst device 40, flows out to the section of front chamber 21 downstream from catalyst device 40. The reformed exhaust gas flows into the upstream end of conduit 30 that is open in partition 27. The exhaust gas then flows out to expansion chamber 26 via outflow holes 32a of conduit 30, and then flows into conduit 30 again via inflow holes 33a of conduit 30, which will be described later. The exhaust gas is then exhausted into the open air from a downstream end opening of a tail section 34 of conduit 30.

Conduit 30 extends linearly through expansion chamber 26 from partition 27 to cover section 25. The upstream end of conduit 30 passes though partition 27 and opens inside front chamber 21. The downstream end of conduit 30 passes through cover section 25 and opens to the open air. Thus, conduit 30 only passes through expansion chamber 26 and does not pass through front chamber 21. Accordingly, conduit 30 does not pass all the way through body section 20.

A partition 35 that blocks flow of exhaust gas in the longitudinal direction inside conduit 30 is provided at a central section of expansion chamber 26. Partition 35 has a round tubular shape and is formed separately from conduit 30. Partition 35 is attached by welding to conduit 30.

In an upstream section 36 of conduit 30 upstream from partition 35, there is an outflow section 32 that has a side surface formed with a plurality of outflow holes 32a. Outflow holes 32a allow exhaust gas introduced into upstream section 36 from exhaust pipe downstream end section 11c via catalyst device 40 to outflow to expansion chamber 26.

In a downstream section 37 of conduit 30 downstream from partition 35, there is an inflow section 33 that has a side surface formed with a plurality of inflow holes 33a. Inflow holes 33a allow exhaust gas, which has flowed out to expansion chamber 26 from upstream section 36 via outflow holes 32a, to flow into downstream section 37.

Partition 35 is positioned in conduit 30 between outflow section 32 and inflow section 33. Outflow and inflow holes 32a and 33a are circular with same diameters, and are positioned regularly at predetermined intervals in the longitudinal and circumferential directions of outflow and inflow sections 32 and 33. In addition, the total number of inflow holes 33a formed in inflow section 33 is smaller than the total number of outflow holes 32a formed in outflow section 32.

Tail section 34, which is downstream from inflow section 33 in downstream section 37, leads exhaust gas, which has flowed into downstream section 37 via inflow holes 33a from expansion chamber 26, to the open air. The side surface of tail section 34 is not formed with holes like outflow holes 32a and inflow holes 33a. The downstream end of tail section 34 protrudes to the downstream side of muffler body 12 from cover section 25 and is formed with an opening from which exhaust gas is exhausted to the open air.

A head section 31 upstream from outflow section 32 in upstream section 36 receives exhaust gas from front chamber 21 and leads it to outflow section 32 at its downstream side. The side surface of head section 31 is not formed with holes like outflow and inflow holes 32a and 33a. An upstream end section of the head section 31 is connected to the partition 27. An upstream end of head section 31 protrudes slightly and opens into front chamber 21 from partition 27. Thus, the volume of front chamber 21 is not reduced substantially by the presence of the upstream end of conduit 30 therein. Accordingly, front chamber 21 can be used effectively for expanding exhaust gas. In addition, in front chamber 21, a comparatively long distance is left between the upstream end of conduit 30 and the downstream end of catalyst device 40. Thus, generation of an uneven flow of exhaust gas inside catalyst device 40 is avoided, and exhaust gas is reformed efficiently. In addition, since a good flow of exhaust gas is maintained in catalyst device 40, and the distance between conduit 30 and catalyst device 40 is reduced, the longitudinal length of muffler body 12 is reduced thereby reducing the weight of muffler 10.

Conduit 30 is a single pipe-shaped member having head section 31, outflow section 32, inflow section 33 and tail section 34. Thus, upstream section 36 upstream from partition 35 and downstream section 37 downstream from partition 35 are formed as an integrated unit.

The inner diameter of conduit 30, from upstream section 36 to downstream section 37, is constant throughout the longitudinal direction thereof. More specifically, inner diameter UD1 of head section 31, inner diameter UD2 of outflow section 32, inner diameter DD1 of inflow section 33, and inner diameter DD2 of tail section 34 are equal. With this configuration, inner diameter UD2 of outflow section 32 is not reduced as compared to inner diameter UD1 of head section 31, and thus the flow of exhaust gas to expansion chamber 26 from outflow holes 32a formed in the side surface of outflow section 32 is not hindered. Accordingly, engine performance is not reduced.

Figure 3:
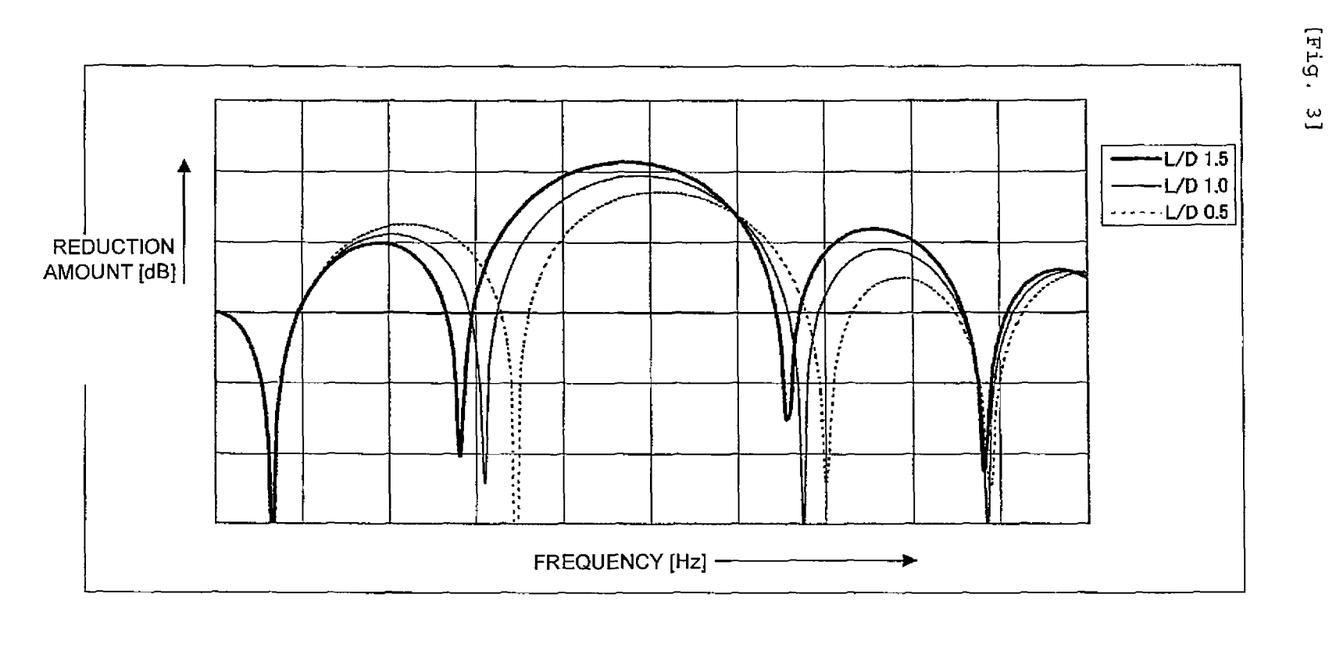
FIG. 3 is a graph showing the relationship of the ratio of a length/inner diameter of an upstream side section that is upstream from an outflow section of a muffler, and a reduction amount of exhaust noise of the muffler.
Figure 4:
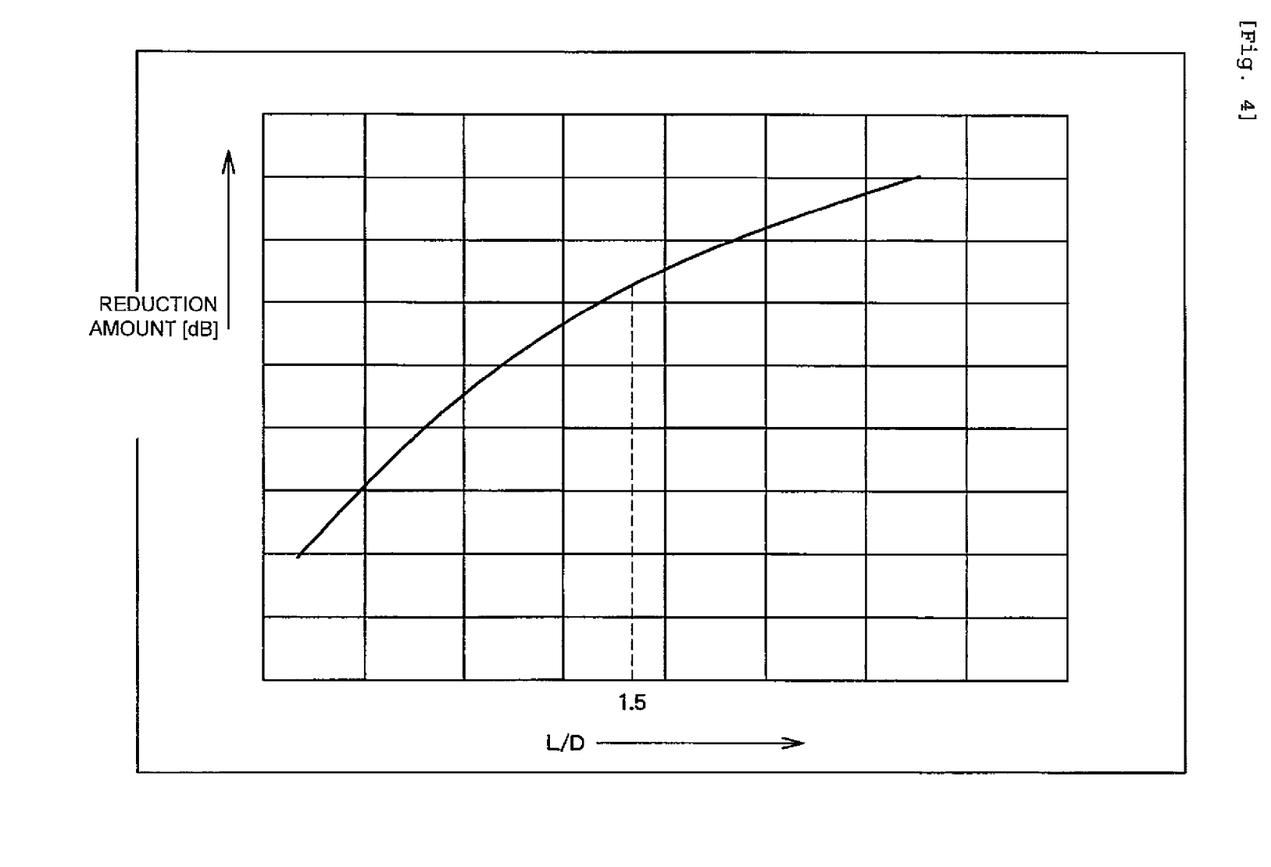
FIG. 4 is a second graph showing the relationship of the ratio of the length/inner diameter of the upstream side section that is upstream from the outflow section of the muffler, and the reduction amount of exhaust noise of the muffler.

Moreover, the length UL1 of head section 31 upstream from outflow section 32 is equal to or more than 1.5 times inner diameter UD1 of head section 31. FIGS. 3 and 4 show the relationship of the ratio of the length UL1 of head section 31 to inner diameter UD1 of head section 31 (hereinafter referred to as the "L/D ratio"), and the reduction amount of the exhaust noise generated by muffler 10. In FIG. 3, the horizontal axis shows the frequency [Hz] of the exhaust noise, and the vertical axis shows the reduction amount [dB] of the exhaust noise. The broken line, the thin solid line, and the thick solid line in FIG. 3 show the reduction amount [dB] of the exhaust noise at the respective frequencies when the L/D ratio is 0.5, 1.0, and 1.5, respectively. In FIG. 4, the horizontal axis shows the L/D ratio, and the vertical axis shows the reduction amount [dB] of the exhaust noise. As can be seen from FIGS. 3 and 4, as the L/D ratio increases, the reduction amount of the exhaust noise is increased. Increase of the L/D ratio may lead to increase in the size and weight of muffler 10. However, in a range where the L/D ratio is smaller than approximately 1.5, the increase rate of the reduction amount of the exhaust noise with respect to the increase of the L/D ratio is comparatively high. Accordingly, if an L/D ratio of 1.5 or more is ensured, muffler 10 can be made small and still be highly effective in reducing exhaust sound.

In the longitudinal direction of conduit 30, the length DL2 of tail section 34 is larger than the combined length of outflow section 32 (UL2) and inflow section 33 (DL1). The length DL2 of tail section 34 is larger than the length UL1 of head section 31. The length DL1 of inflow section 33 is smaller than the length UL2 of outflow section 32.

Figure 5:
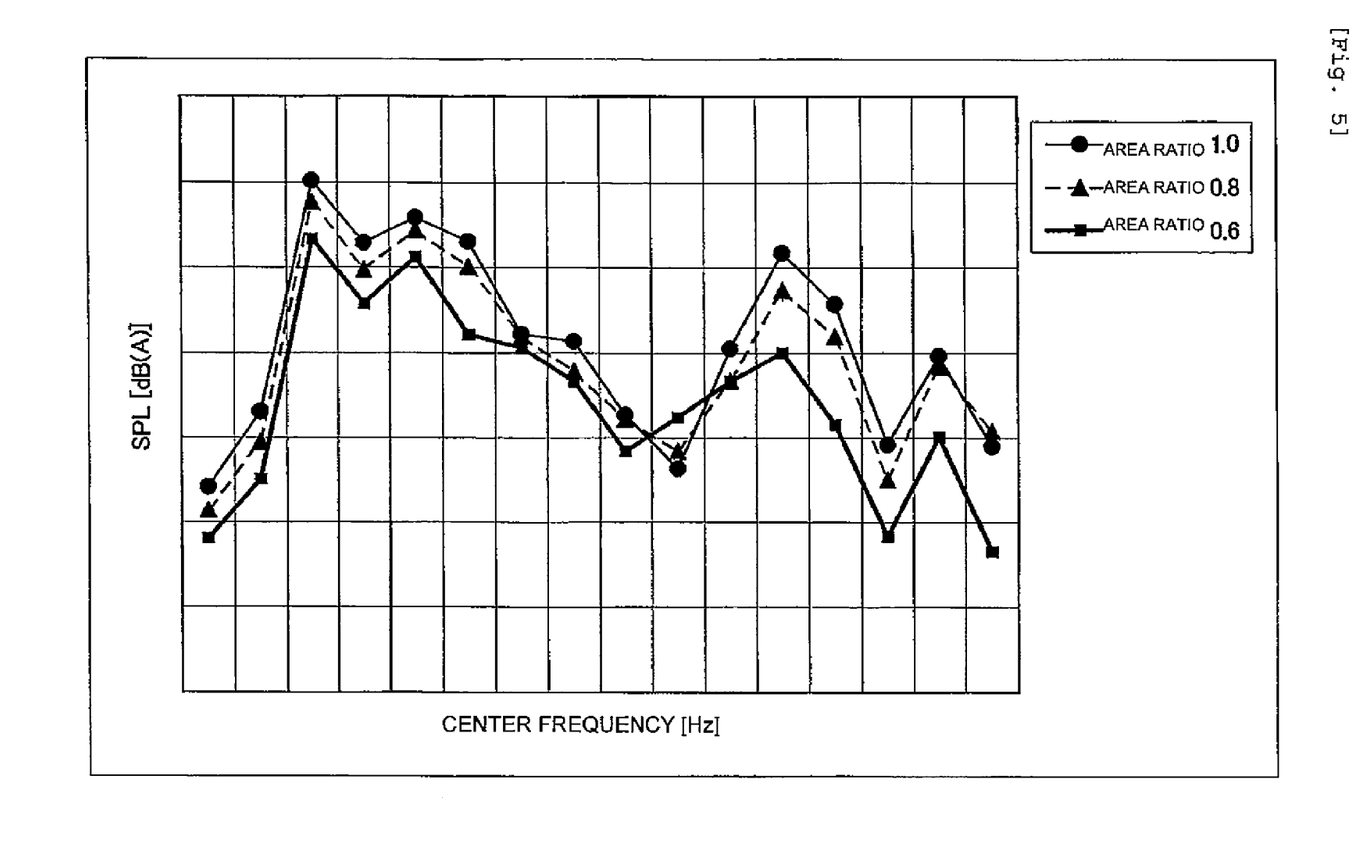
FIG. 5 is a graph showing the relationship of a ratio of the inflow hole surface area/conduit cross sectional area of the muffler, and a sound pressure level of exhaust noise in the muffler.

In addition, the opening surface area of inflow holes 33a is smaller than the inner cross sectional area of the pipe of tail section 34 that is downstream from inflow section 33. More specifically, the total opening surface area of the plurality of inflow holes 33a formed in the side surface of inflow section 33 (the sum of the round opening surface areas of each inflow hole 33a) is smaller than the cross sectional area of the inner bore of tail section 34 (the round cross section having inner diameter DD2 of tail section 34). FIG. 5 shows the relationship between the ratio of the opening surface area of inflow holes 33a to the inner cross sectional area of the pipe of tail section 34 (hereinafter referred to as "the ratio of the opening surface area/cross section area") and the sound pressure level of the exhaust noise generated by muffler 10. FIG. 5 shows the center frequency [Hz] of the exhaust noise on the horizontal axis, and the Sound Pressure Level (SPL) [dB(A)] of the exhaust noise in ⅓ octave analysis on the vertical axis. FIG. 5 shows respective sound pressure levels in different frequency bands, with the circle marks showing a case when the ratio of the opening surface area/cross section area is 1.0; the triangle marks showing a case when the ratio of the opening surface area/cross section area is 0.8; and the square marks showing a case when the ratio of the opening surface area/cross section area is 0.6. As can be seen from FIG. 5, in particular, in the case that the ratio of the opening surface area/cross section area is 0.6, as compared to the cases when the ratio of the opening surface area/cross section area is 1.0 or 0.8, the difference of the sound pressure level in the low frequency band and the sound pressure level in the high frequency band is large, and it is possible to effectively reduce the sound pressure level in the region where the frequency is comparatively high. More specifically, by setting the opening surface area of inflow holes 33a to be smaller than the inner cross sectional area of the pipe of tail section 34, it is possible to more effectively reduce the high frequency region in the exhaust sound, as compared to the low frequency region. Further, by making the low frequency region more conspicuous, it is possible to generate an appealing exhaust sound with an accentuated low sound.

Further, the opening surface area of outflow holes 32a is set larger than the inner cross sectional area of the pipe of head section 31 that is upstream from outflow section 32. More specifically, the total opening surface area of the plurality of outflow holes 32a formed in the side surface of outflow section 32 (the sum of the round opening surface areas of each outflow hole 32a) is larger than the cross sectional area of the inner bore of head section 31 (the round cross section having inner diameter UD1 of head section 31). It is preferable that the ratio of the opening surface area of outflow holes 32a with respect to the inner cross sectional area of the pipe of head section 31 is set in a range equal to or less than 1.5 times. If this configuration is adopted, it is possible to effectively reduce fluid resistance that occurs along with flow of exhaust gas from conduit 30 to expansion chamber 26.

Second Embodiment

Figure 6:
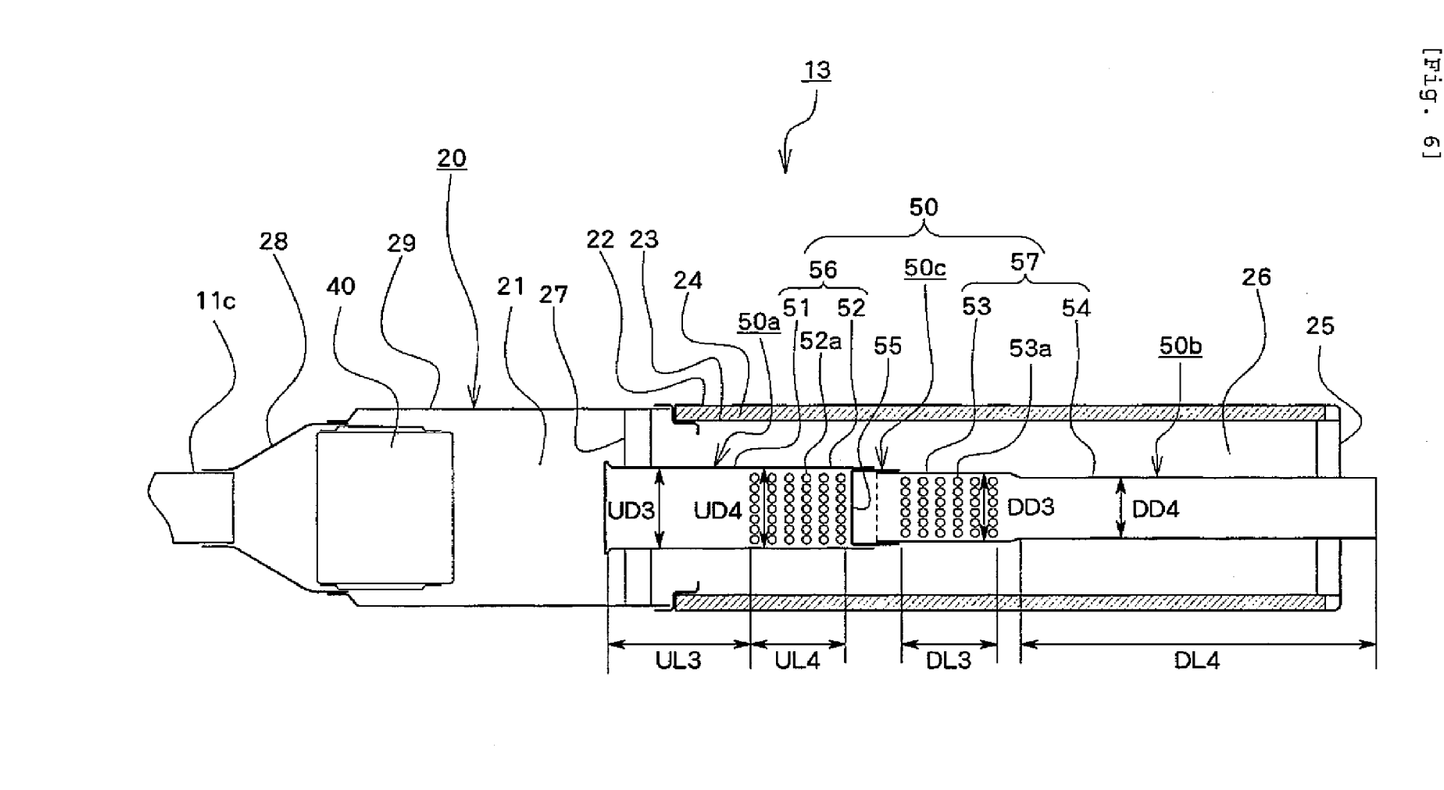
FIG. 6 is a cross sectional view of a muffler according to a second embodiment of the invention.

FIG. 6 is a cross sectional view of a muffler body 13 according to a second embodiment. Muffler body 13 is equipped to a motorcycle having structural members that are the same as in motorcycle 1 (FIG. 1), and thus a repeated explanation of these structural elements is omitted. Further, structural elements of muffler body 13 that are the same as those of muffler body 12 are denoted with the same reference numerals and a repeated explanation is omitted.

Muffler body 13 has body section 20 provided with each of front chamber 21 and expansion chamber 26; and a conduit 50 that passes though the longitudinal direction of expansion chamber 26. Catalyst device 40 is provided in front chamber 21.

In muffler body 13, exhaust gas flows first from exhaust pipe downstream end section 11c to the section of front chamber 21 that is upstream from catalyst device 40. The exhaust gas then passes to the downstream side of catalyst device 40, and having been reformed by the reaction of the catalyst in catalyst device 40, flows out to the section of front chamber 21 that is downstream from catalyst device 40. The reformed exhaust gas flows into the upstream end of conduit 50 that is open in partition 27. The exhaust gas then flows out to expansion chamber 26 via outflow holes 52a of conduit 50, and into conduit 50 again via inflow holes 53a of conduit 50. The exhaust gas is then exhausted into the open air from a downstream end opening of tail section 54.

Conduit 50 extends linearly through expansion chamber 26 from partition 27 to cover section 25. The upstream end of conduit 50 passes though partition 27 and opens inside front chamber 21, and the downstream end of conduit 50 passes through cover section 25 and opens to the open air. Thus, conduit 50 only passes through expansion chamber 26 in body section 20 and does not pass through front chamber 21. Accordingly, conduit 50 does not pass all the way through body section 20.

A partition 55 that blocks flow of exhaust gas in the longitudinal direction inside conduit 50 is provided in a central section of expansion chamber 26. In an upstream section 56 of conduit 50 upstream from partition 55, there is an outflow section 52 that has a side surface formed with a plurality of outflow holes 52a. Outflow holes 52a allow exhaust gas introduced into upstream section 56 from exhaust pipe downstream end section 11c via catalyst device 40 to outflow to expansion chamber 26. In a downstream section 57 of conduit 50 downstream from partition 55, there is an inflow section 53 that has a side surface formed with a plurality of inflow holes 53a. Inflow holes 53a allow exhaust gas, which has flowed out to expansion chamber 26 from upstream section 56 via outflow holes 52a, to flow in to downstream section 57. Partition 55 is positioned between outflow section 52 and inflow section 53. Outflow holes 52a and inflow holes 53a are circular with same diameters, and are positioned regularly at predetermined intervals in the longitudinal and circumferential directions of outflow and inflow sections 52 and 53.

The side surface of tail section 34 downstream from inflow section 53 in downstream section 57 is not formed with holes like outflow and inflow holes 52a and 53a. The downstream end of tail section 54 protrudes to the downstream side of muffler body 13 from cover section 25 and is formed with an opening from which exhaust gas is exhausted to the open air.

The side surface of head section 51 upstream from outflow section 52 in upstream section 56 is not formed with holes like outflow and inflow holes 52a and 53a. An upstream end section of head section 51 is connected to partition 27 and protrudes slightly and opens into front chamber 21 from partition 27.

Conduit 50 is structured by inter-connecting three members, namely, an upstream passage 50a, a downstream passage 50b, and a connecting section 50c. Upstream passage 50a includes a head section 51 and outflow section 52. Downstream passage 50b has inflow section 53 and tail section 54. Connecting section 50c, which is formed separately from upstream passage 50a and downstream passage 50b, has a round tubular shape with a bottom section that forms partition 55. In other words, upstream section 56 upstream from partition 55, downstream section 57 downstream from partition 55, and partition 55 are formed as separated units. The downstream end of upstream passage 50a and the upstream end of downstream passage 50b are open, and the outer diameter of the upstream end of downstream passage 50b is smaller than the inner diameter of the opening of upstream passage 50a. Connecting section 50c is blocked at its upstream end by partition 55, and is open at its downstream end. The outer and inner diameters of connecting section 50c are constant throughout the longitudinal direction thereof. The outer diameter of the upstream end of connecting section 50c and the inner diameter of the opening of the downstream end of upstream passage 50a are substantially equal, and the inner diameter of the downstream end of connecting section 50c and the outer diameter of the upstream end of downstream passage 50b are substantially equal. The upstream end of connecting section 50c is inserted in the opening of the downstream end of upstream passage 50a; the downstream end of upstream passage 50a and partition 55 of connecting section 50c are attached by welding; the upstream end of downstream passage 50b is inserted in the opening of the downstream end of connecting section 50c; and the downstream end of connecting section 50c and the upstream end of downstream passage 50b are connected by welding.

The inner diameter of upstream passage 50a is constant throughout the longitudinal direction thereof, namely, inner diameter UD3 of head section 51 and inner diameter UD4 of outflow section 52 are equal. With this configuration, in conduit 50, inner diameter UD4 of outflow section 52 is not reduced as compared to inner diameter UD3 of head section 51. As a result, the flow of exhaust gas to expansion chamber 26 from outflow holes 52a formed in the side surface of outflow section 52 is not hindered, and engine performance is not reduced.

In downstream passage 50b, inner diameter DD3 of inflow section 53 is smaller than inner diameter of upstream passage 50a, namely, inner diameter UD3 of head section 51, and inner diameter UD4 of outflow section 52. In downstream passage 50b, inner diameter DD4 of tail section 54 downstream from inflow section 53 is smaller than inner diameter DD3 of inflow section 53. More specifically, inner diameter DD4 of tail section 54 is smaller than inner diameter UD3 of head section 51 and inner diameter UD4 of outflow section 52. With this configuration, conduit 50 has a section downstream from outflow section 52 that has a smaller inner diameter than the inner diameter of outflow section 52. As a result, exhaust noise volume generated by muffler 10 is effectively reduced.

In the longitudinal direction of conduit 50, the length DL4 of tail section 54 is larger than the combined length of outflow section 52 (UL4) and inflow section 53 (DL3). The length DL4 of tail section 54 is longer than the length UL3 of head section 51. The length DL3 of inflow section 53 is equal to the length UL4 of outflow section 52.

With this configuration, the inner diameter of upstream section 56 from head section 51 to outflow section 52 is maintained without size reduction. Further, inner diameter DD3 of inflow section 53 and inner diameter DD4 of tail section 54 are reduced as compared to the inner diameter of upstream section 56 including outflow section 52. Moreover, inner diameter DD3 of inflow section 53 is reduced as compared to inner diameter UD4 of outflow section 52, and inner diameter DD4 of tail section 54 is reduced as compared to inner diameter DD3 of inflow section 53. As a result, the inner diameter of downstream section 57 is reduced in a step-like manner toward the downstream side.

The invention is not limited to these examples. For example, the muffler body may have a plurality of expansion chambers rather than just one expansion chamber. In this case a conduit may be provided to pass through each expansion chamber. Further, the shape, number and arrangement of outflow holes and inflow holes formed in side surfaces of the conduit are not limited to those described above, and a different design may be chosen. In addition, the shape, number and arrangement of outflow and inflow holes may be mutually the same or different. Further, the length of the tail section may be equal to the combined length of the 1 outflow and inflow sections.

The particular embodiments of the invention described in this document should be considered illustrative, rather than restrictive. Modification to the described embodiments may be made without departing from the spirit of the invention as defined by the following claims.

The invention claimed is:

1. A muffler comprising a front chamber upstream from a chamber partition, an expansion chamber downstream from the chamber partition, and a conduit passing through the expansion chamber, wherein the conduit comprises:
   a conduit partition;
   an upstream section upstream from the conduit partition comprising an outflow section defining a plurality of outflow holes that allows exhaust gas to flow out into the expansion chamber, and a head section upstream from the outflow section having an open upstream end that passes through the chamber partition and protrudes into the front chamber from the chamber partition; and
   an inflow section downstream from the conduit partition and defining a plurality of inflow holes that allows exhaust gas to flow in from the expansion chamber, wherein
   a sum of the open areas of the plurality of inflow holes is smaller than an inner cross sectional area of a downstream side section of the conduit downstream from the inflow section.

2. The muffler of claim 1, wherein the plurality of outflow holes are provided in a side surface of the conduit.

3. The muffler of claim 1, wherein the plurality of inflow holes are provided in a side surface of the conduit.

4. The muffler of claim 1, wherein the conduit partition comprises a partition wall provided at a central section of the conduit.

5. The muffler of claim 1, wherein the open upstream end of the conduit defines an opening that is coaxial with the conduit end.

6. The muffler of claim 1, wherein the open upstream end of the conduit defines an opening having a diameter corresponding to an internal diameter of the conduit upstream end.

7. The muffler of claim 1, wherein the open upstream end of the conduit is directly adjacent the chamber partition.

8. The muffler of claim 1, wherein the upstream end of the conduit extends through the chamber partition.

9. The muffler of claim 8, wherein the upstream end of the conduit projects into the front chamber.

10. The muffler of claim 9, wherein the upstream end of the conduit that projects into the front chamber has a length equal to or less than 1.0 times, 0.75 times, 0.5 times, 0.4 times, 0.3 times, 0.25 times or 0.2 times an inner diameter of the upstream end of the conduit.

11. The muffler of claim 9, wherein the upstream end of the conduit that projects into the front chamber has a length that is equal to or less than half of a length of an upstream side section of the conduit upstream from the outflow section.

12. The muffler of claim 9, wherein the upstream end of the conduit that projects into the front chamber has a length that is equal to or less than an inner diameter of an upstream side section of the conduit upstream from the outflow section.

13. The muffler of claim 1, further comprising a catalyst device for reforming exhaust gas and provided in the front chamber.

14. The muffler of claim 1, wherein an upstream side section of the conduit upstream from the outflow section has a length that is equal to or more than 1.5 times an inner diameter of the upstream side section.

15. The muffler of claim 14, wherein the sum of the open areas of the plurality of inflow holes is equal to or less than 0.6 times the inner cross sectional area of the downstream side section of the conduit downstream from the inflow section.

16. The muffler of claim 1, wherein the sum of the open areas of the plurality of outflow holes is larger than an inner cross sectional area of an upstream side section of the conduit upstream from the outflow section.

17. The muffler of claim 16, wherein the sum of the open areas of the plurality of outflow holes is less than 1.5 times the inner cross sectional area of the upstream side section of the conduit upstream from the outflow section.

18. A muffler comprising a front chamber upstream from a chamber partition, an expansion chamber downstream from the chamber partition, and a conduit passing through the expansion chamber, wherein the conduit comprises:
   a partition wall at a central section of the conduit;
   an upstream section upstream from the partition wall comprising an outflow section having a side surface formed with a plurality of outflow holes that allow exhaust gas that has flown in from the upstream end of the conduit to flow out to the expansion chamber, and a head section upstream from the outflow section having an open upstream end that passes through the chamber partition and protrudes into the front chamber from the chamber partition; and
   an inflow section downstream from the partition wall having a side surface formed with a plurality of inflow holes that allow exhaust gas to flow in from the expansion chamber, wherein
   a sum of open areas of the plurality of inflow holes is smaller than an inner cross sectional area of a downstream side section of the conduit downstream from the inflow section.

19. A vehicle having a muffler comprising a front chamber upstream from a chamber partition, an expansion chamber downstream from the chamber partition, and a conduit passing through the expansion chamber, wherein the conduit comprises:
   a conduit partition;
   an upstream section upstream from the conduit partition comprising an outflow section defining a plurality of outflow holes that allows exhaust gas to flow out into the expansion chamber, and a head section upstream from the outflow section having an open upstream end that passes through the chamber partition and protrudes into the front chamber from the chamber partition; and an inflow section downstream from the conduit partition and defining a plurality of inflow holes that allows gas to flow in from the expansion chamber, wherein a sum of open areas of the plurality of inflow holes is smaller than an inner cross sectional area of a downstream cross section of the conduit downstream from the inflow section.

20. The muffler of claim 1, wherein the plurality of outflow holes and inflow holes are provided in a side surface of the conduit, and the total number of inflow holes is smaller than the total number of outflow holes.

21. The muffler of claim 18, wherein the plurality of outflow holes and inflow holes are provided in a side surface of the conduit, and the total number of inflow holes is smaller than the total number of outflow holes.

22. The muffler of claim 19, wherein the plurality of outflow holes and inflow holes are provided in a side surface of the conduit, and the total number of inflow holes is smaller than the total number of outflow holes.

23. The muffler of claim 13, further comprising:

an upstream section upstream from a catalyst device, wherein the front chamber is larger than the upstream section, and downstream from the upstream section and the catalyst device.

24. The muffler of claim 1, further comprising:

a catalyst device for reforming exhaust gas, the catalyst device straddling a taper section and an extending section in the front chamber.

* * * * *